(12) United States Patent
Sun

(10) Patent No.: US 8,465,200 B2
(45) Date of Patent: Jun. 18, 2013

(54) METHOD FOR IMPLEMENTING DEPTH DECONVOLUTION ALGORITHM FOR ENHANCED THERMAL TOMOGRAPHY 3D IMAGING

(75) Inventor: Jiangang Sun, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 651 days.

(21) Appl. No.: 12/793,829

(22) Filed: Jun. 4, 2010

(65) Prior Publication Data

US 2011/0299752 A1  Dec. 8, 2011

(51) Int. Cl.
*G01N 25/18* (2006.01)
*G06K 9/00* (2006.01)

(52) U.S. Cl.
USPC ............................................. 374/44; 382/131

(58) Field of Classification Search
USPC ............................................. 374/44; 382/131
See application file for complete search history.

(56) References Cited

U.S. PATENT DOCUMENTS

| | | | |
|---|---|---|---|
| 5,639,162 A * | 6/1997 | Sai | 374/161 |
| 5,689,332 A | 11/1997 | Ellingson et al. | |
| 6,285,449 B1 | 9/2001 | Ellingson et al. | |
| 6,517,236 B2 | 2/2003 | Sun et al. | |
| 6,517,238 B2 | 2/2003 | Sun et al. | |
| 6,730,912 B2 | 5/2004 | Sun et al. | |
| 7,042,556 B1 | 5/2006 | Sun | |
| 7,365,330 B1 | 4/2008 | Sun | |
| 7,538,938 B2 | 5/2009 | Sun | |
| 2001/0007571 A1 * | 7/2001 | Murphy et al. | 374/5 |
| 2002/0018510 A1 * | 2/2002 | Murphy et al. | 374/45 |
| 2007/0299628 A1 | 12/2007 | Sun | |

OTHER PUBLICATIONS

Microwave-source time-resolved infrared radiometry for monitoring of curing and deposition processes, Robert Osiander; Jane W. Maclachlan Spicer; John C. Murphy, Proc. SPIE 2473, Thermosense XVII: An International Conference on Thermal Sensing and Imaging Diagnostic Applications, 194 (Mar. 28, 1995); doi:10.1117/12.204855.*
Bakirov, V.F., Kline, R.A., and Winfree, W.P., 2003, "Multiparameter Thermal Tomography," in Rev. Progress QNDE, ed. D.O. Thompson and D.E. Chimenti, vol. 23, pp. 461-468.
J.G. Sun, 2006, "Analysis of Pulsed Thermography Methods for Defect Depth Prediction," J. Heat Transfer, vol. 128, pp. 329-338.

* cited by examiner

*Primary Examiner* — Joseph Burgess
(74) *Attorney, Agent, or Firm* — Joan Pennington

(57) ABSTRACT

A computer-implemented method, apparatus, and computer program product implement enhanced thermal tomography three-dimensional (3D) thermal effusivity imaging. Experimental thermal imaging data is acquired. A response function is derived and a convolution formulation is constructed from the experimental thermal imaging data. A deconvolution solution procedure is implemented that includes constructing a matrix solution equation with a damping parameter, and solving the matrix solution equation with a selected number of iterations to construct a plurality of effusivity images. Using the novel depth deconvolution algorithm with experimental data acquired from a one-sided pulsed thermal-imaging system provides greater sensitivity for internal sample features substantially eliminating degradation in depth resolution.

20 Claims, 13 Drawing Sheets

| Hole | Diameter (mm) | Depth (mm) |
|---|---|---|
| A | 7.5 | 0.25 |
| B | 7.5 | 1.12 |
| C | 7.5 | 0.97 |
| D | 7.5 | 0.87 |
| E | 5.0 | 0.78 |
| F | 2.5 | 0.85 |
| G | 1.0 | 0.85 |

PREDICTED THERMAL
EFFUSIVITY IMAGE
USING MATRIX $[D\delta_{i,j} + R_{i,j}]$
(EQ. 23)
1 ITERATION PREDICTED THERMAL
EFFUSIVITY IMAGE
USING MATRIX $[D\delta_{i,j} + R_{i,j}]$
(EQ. 23)
5 ITERATIONS

METHOD FOR IMPLEMENTING DEPTH DECONVOLUTION ALGORITHM FOR ENHANCED THERMAL TOMOGRAPHY 3D IMAGING

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improved method and apparatus for implementing thermal tomographic imaging, and more particularly to a computer-implemented method, apparatus, and computer program product or software for implementing enhanced thermal tomography three-dimensional (3D) thermal effusivity imaging using a novel depth deconvolution algorithm with experimental data acquired from a pulsed thermal-imaging system.

DESCRIPTION OF THE RELATED ART

Pulsed thermal imaging is widely used for nondestructive evaluation (NDE) of advanced materials and components. The premise is that the flow of heat from the surface of a solid is affected by internal flaws such as debonds, voids or inclusions.

U.S. Pat. No. 6,517,236 issued Feb. 11, 2003 to Jiangang Sun, William A. Ellingson, and Chris M. Deemer discloses a method and apparatus for automated non-destructive evaluation (NDE) thermal imaging tests of combustor liners and other products. The apparatus for automated NDE thermal imaging testing of a sample includes a flash lamp positioned at a first side of the sample. An infrared camera is positioned near a second side of the sample. A linear positioning system supports the sample. A data acquisition and processing computer is coupled to the flash lamp for triggering the flash lamp. The data acquisition and processing computer is coupled to the infrared camera for acquiring and processing image data. The data acquisition and processing computer is coupled to the linear positioning system for positioning the sample for sequentially acquiring image data.

U.S. Pat. No. 6,542,849 issued Apr. 1, 2003 to Jiangang Sun discloses a method and apparatus for determining the thickness of a sample and defect depth using thermal imaging in a variety of plastic, ceramic, metal and other products. A pair of flash lamps is positioned at a first side of the sample. An infrared camera is positioned near the first side of the sample. A data acquisition and processing computer is coupled to the flash lamps for triggering the flash lamps. The data acquisition and processing computer is coupled to the infrared camera for acquiring and processing thermal image data. The thermal image data are processed using a theoretical solution to analyze the thermal image data to determine the thickness of a sample and defect depth.

U.S. Pat. No. 7,538,938 issued May 26, 2009 to Jiangang Sun discloses an optical filter is provided for flash lamps used in pulsed thermal imaging. The optical filter covers a flash lamp and allows visible wavelength to penetrate while blocking infrared wavelengths that are sensitive to an infrared camera. The filter substantially eliminates the infrared radiation from flash lamps to allow for accurate detection of surface temperature during pulsed thermal imaging tests. The filter is made from a borosilicate optical material. The filter allows for the complete data obtained in a thermal imaging test to be usable and accurate, without errors introduced by flash reflection effect and residual heating effect.

U.S. Pat. No. 7,365,330, entitled "METHOD FOR THERMAL TOMOGRAPHY OF THERMAL EFFUSIVITY FROM PULSED THERMAL IMAGING" issued Apr. 29, 2008 to the present inventor, Jiangang Sun discloses a computer-implemented method for automated thermal computed tomography that includes providing an input of heat, for example, with a flash lamp, onto the surface of a sample. The amount of heat and the temperature rise necessary are dependent on the thermal conductivity and the thickness of the sample being inspected. An infrared camera takes a rapid series of thermal images of the surface of the article, at a selected rate, which can vary from 100 to 2000 frames per second. Each infrared frame tracks the thermal energy as it passes from the surface through the material. Once the infrared data is collected, a data acquisition and control computer processes the collected infrared data to form a three-dimensional (3D) thermal effusivity image.

The above-identified patent provided a first unique practical thermal tomography 3D imaging method that provided significant improvements over prior art systems. However, the results from the thermal tomography exhibit spatial resolution degradation along the depth, or axial direction. This thermal tomography method cannot obtain high-resolution imaging in deeper depths because of increased thermal diffusion with depth.

An effective 3D thermal tomography method must be able to determine the magnitude or intensity of a material parameter and its 3D distribution in the interior of the tested sample. The material parameter is typically displayed as the grayscale of the 3D data. To be effective for material characterization, it is desirable that the measured parameter is a material's physical property, not simply the contrast of material irregularity.

For example, x-ray computed tomography (CT) has been widely used for material analysis because it measures an attenuation parameter that is directly related to material composition and density, while optical coherence tomography detects a backscatter intensity that is related to refractive index mismatch at interfaces but not to the materials themselves.

Thermal tomography does determine a material property, thermal effusivity, and resolves its 3D spatial distribution. In NDE applications, thermal tomography allows for direct examination of material composition distribution and all flaws with various severities and geometry within a test sample. Using the known thermal tomography method the resolution degrades linearly with depth, which cannot be readily corrected. This resolution degradation is the result of thermal diffusion within the 3D material and is considered to be the major hurdle for expanded applications of this technology. Both lateral and depth diffusions affect the resolution. Conventional deconvolution methods commonly used to enhance blurred 2D images provide some correction for the lateral diffusion. No depth deconvolution algorithm or formulation is available because of the unique heat transfer process in one-sided pulsed thermal imaging.

A principal aspect of the present invention is to provide an improved computer-implemented method, apparatus, and computer program product or software for implementing enhanced thermal tomography three-dimensional (3D) thermal effusivity imaging using a novel depth deconvolution algorithm with experimental data acquired from a pulsed thermal-imaging system.

Other important aspects of the present invention are to provide such computer-implemented method, apparatus, and computer program product substantially without negative effect and that overcome some of the disadvantages of prior art arrangements.

SUMMARY OF THE INVENTION

In brief, a computer-implemented method, apparatus, and computer program product are provided for implementing thermal tomography three-dimensional (3D) thermal effusivity imaging. Experimental thermal imaging data is acquired. A response function is derived and a convolution formulation is constructed using the experimental thermal imaging data. A deconvolution solution procedure is implemented that includes constructing a matrix solution equation with a damping parameter, and solving the matrix solution equation with a selected number of iterations to construct a plurality of effusivity images.

In accordance with features of the invention, the deconvolution solution procedure is implemented using the acquired experimental thermal imaging data including calculating an effusivity depth distribution function represented by:

$$e_{a,i} + Dp_i^n = \sum_{j=1}^{M} p_j^{n+1}[D\delta_{i,j} + R_{i,j}],$$

$$i = 1, 2, 3, \ldots M, n = 0, 1, 2, 3, \ldots$$

where thermal effusivity $E_i$ depth distribution is identified by $$E_i = \sum_{j=i}^{M} p_j^{n+1}$$

for $i, j = 1, 2, 3, \ldots M$ uniformly discretized number (1–M) of uniform grids of set size for the entire depth,
the superscript n is the iteration number,
$p_j$ is unknown parameter to be solved, and in the first step of the iteration, $p_j^0 = 0$;
D is a positive constant defining a damping parameter,
$\delta_{i,j}$ is the Kronecker delta defined by:

$$\delta_{i,j} = \begin{cases} 1, & \text{if } i = j \\ 0, & \text{if } i \neq j \end{cases}$$

and $R_{i,j}$ is an integral response function defined by:

$$R_{i,j} = R(z_i/l_j) = \frac{1}{\frac{z_i}{l_j}\left[1 + 2\sum_{n=1}^{\infty} \exp\left(-n^2\pi^2 \frac{z_i^2}{l_j^2}\right)\right]}$$

with $z_i$ and $l_j$ as parameters in the depth direction.

In accordance with features of the invention, using the novel depth deconvolution algorithm with experimental data acquired from a one-sided pulsed thermal-imaging system provides greater sensitivity for internal sample features substantially eliminating degradation in depth resolution.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, the new depth deconvolution algorithm provides a new mathematical formulation and solution procedure for thermal tomography that can substantially eliminate the degradation of spatial resolution with depth. The new algorithm is developed based upon convolution theory. It is verified to reproduce the exact deconvolution solution substantially without any degradation in depth resolution. It is also validated to obtained superior experimental data than those by the known method, such as disclosed by the above-identified U.S. Pat. No. 7,365,330. This new algorithm may therefore further establish thermal tomography as an advanced method for high-resolution 3D imaging in many scientific, medical, and engineering applications.

The method of the invention includes (1) the derivation of a response function, (2) construction of a convolution formulation, and (3) implementation of a deconvolution solution procedure. The response function represents how much diffusion is present in the heat transfer process. The convolution formulation relates the measured surface temperature data with the convolution of material's internal effusivity and the response function. Both the response function and convolution formulation are derived based on the theoretical 1D solution for a plate under pulsed thermal-imaging condition. This convolution formulation is therefore an identity equation for thermal tomography reconstruction of a plate sample. The conventional convolution formulation leads to a singular-value matrix that results in solution oscillations if a direct matrix inversion method is used.

In accordance with features of the invention, the deconvolution solution for thermal effusivity is based on an iterative procedure because the original convolution formulation leads to a singular-value matrix that results in solution oscillations at the singularity depth (back surface of the plate) if a direct matrix inversion method is used. The iterative solution procedure of the invention introduces the damping parameter D to facilitate matrix inversion to obtain the substantially exact solution.

In accordance with features of the invention, the deconvolution solution is based on an iteration procedure, where a damping parameter D is introduced in the formulation to remove the singularity of the prior art method and to obtain the substantially exact solution.

Figure 1:
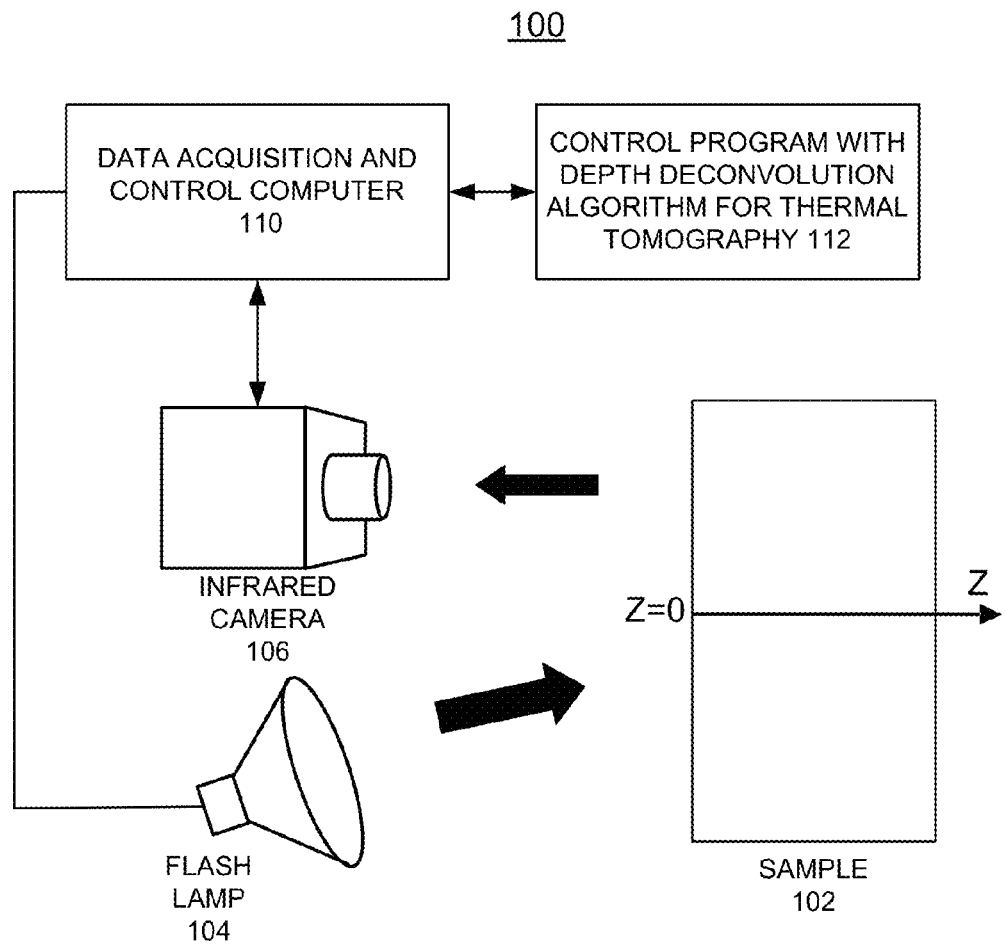
FIG. 1 is a diagram illustrating a thermal imaging apparatus for implementing a method for thermal tomography 3D imaging using a novel depth deconvolution algorithm from one-sided pulsed thermal imaging in accordance with the preferred embodiment.
Figure 2:
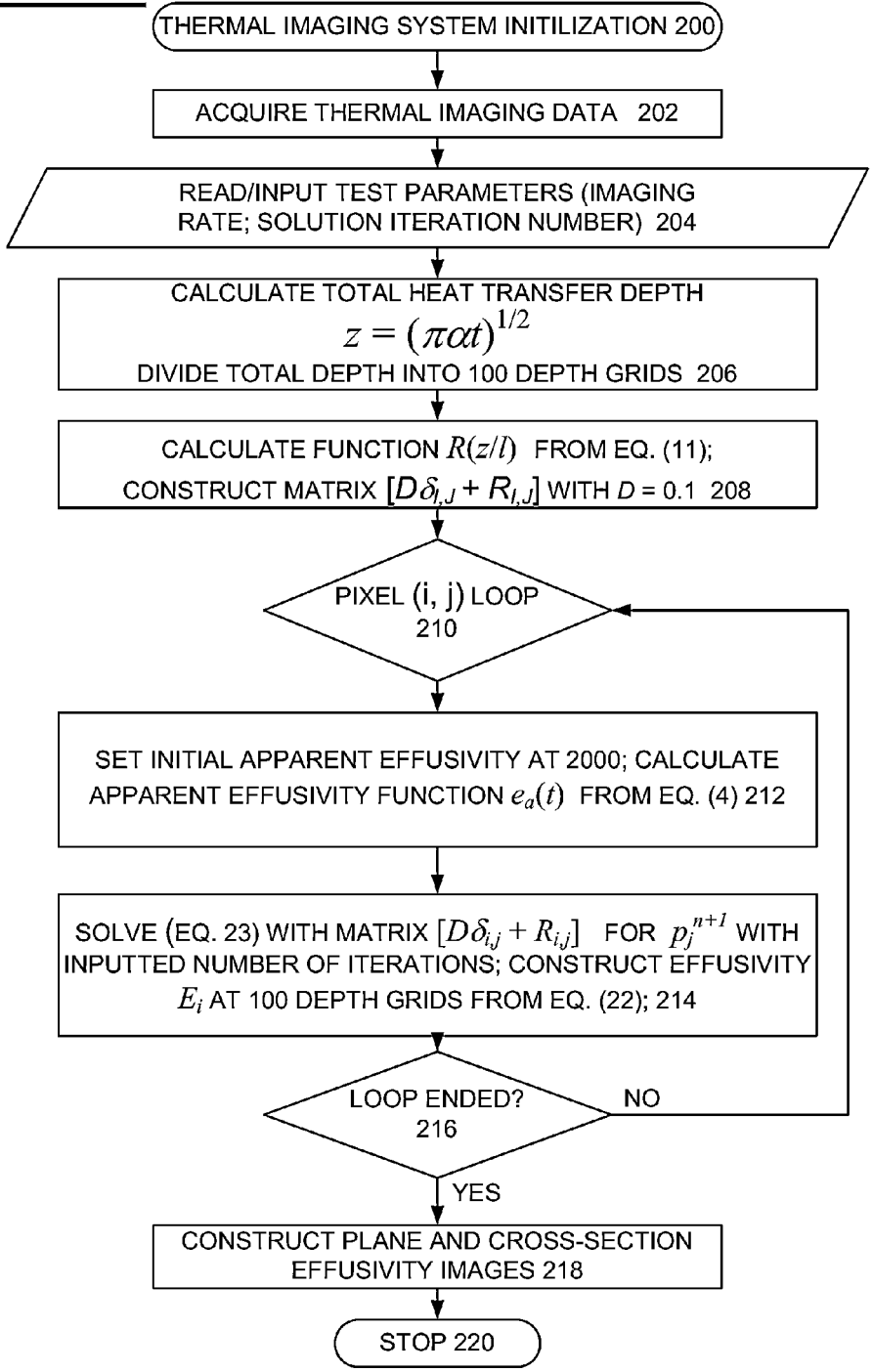
FIG. 2 is a flow chart illustrating exemplary steps for implementing thermal tomography 3D imaging using a novel depth deconvolution algorithm in accordance with the preferred embodiment.

Having reference now to the drawings, in FIG. 1, there is shown a thermal imaging apparatus or system for implementing methods for thermal tomography 3D imaging using a novel depth deconvolution algorithm from one-sided pulsed thermal imaging in accordance with the preferred embodiment and generally designated by the reference numeral 100, such as a sample 102. Thermal imaging system 100 includes a flash lamp 104 providing a pulse of thermal energy for heating a first surface of the sample 102. Thermal imaging system 100 includes, for example, a high-resolution and high-sensitivity infrared camera 106, for example, with 256×256 pixel focal plane array of infrared sensors for taking a rapid series of thermal images of the surface of the article, at a rate, which can vary from 100 to 2000 frames per second. Each infrared frame tracks the thermal energy as it passes from the surface through the material. Infrared camera 106 is positioned on the same side of the sample 102 as the flash lamp 104. Thermal imaging system 100 includes a data acquisition and control computer 110 together with a control program 112 stored on computer readable media including the novel depth deconvolution algorithm for implementing methods in accordance with the preferred embodiment, for example, as shown in FIG. 2. Once the infrared data is collected, it is processed to form the 3D images. A major advantage of the method is that the enhanced 3D image of an article can be provided in a very short period of time, such as in minutes or less.

Referring now FIG. 2, there are shown exemplary steps for implementing a method for implementing thermal tomography 3D imaging using a novel depth deconvolution algorithm from one-sided pulsed thermal imaging in accordance with the preferred embodiment.

As indicated in a block 200, first initialization of the thermal imaging system is preformed. Thermal imaging data is acquired as indicated in a block 202. Multiple test parameters are read, for example, imaging rate, number of frames, and the like, as indicated in a block 204. Next a total heat transfer depth is calculated from Eq. (5);

$$z=(\pi\alpha t)^{1/2} \tag{5}$$

and the total depth is divided into 100 depth grids as indicated in a block 206. The 100 depth grids are an example and the number of depth grids can be changed.

A new function R(z/l) is defined as:

$$R(z/l) = \frac{1}{\frac{z}{l}\left[1 + 2\sum_{n=1}^{\infty} \exp\left(-n^2\pi^2\frac{z^2}{l^2}\right)\right]} \tag{11}$$

where z is coordinate in the depth direction, and z=0 is the sample surface receiving heating, and the function R(z/l) is related to diffusion at an interface at l.

As indicated at a block 208, the function R(z/l) is calculated using the above EQ. (11) and a matrix [Dδ$_{i,j}$+R$_{i,j}$] is constructed where D is a positive constant defining a damping parameter, for example set D=0.1,
where =R(z$_i$/l$_j$),
δ$_{i,j}$ is represented by:

$$\delta_{i,j} = \begin{cases} 1, & \text{if } i = j \\ 0, & \text{if } i \neq j \end{cases}$$

δ$_{i,j}$ is the Kronecker delta.

A pixel (i, j) loop is obtained as indicated in a decision block 210, then as indicated in a block 212 an initial apparent effusivity is set at 2000 and an apparent effusivity function is represented by;

$$e_a(t) = \frac{Q}{T(t)\sqrt{\pi t}} \tag{4}$$

and the apparent effusivity function is calculated using EQ. (4). Next as indicated at a block 214, the matrix is solved from the following EQ. (23) calculating an effusivity depth distribution function represented by:

$$e_{a,i} + Dp_i^n = \sum_{j=1}^{M} p_j^{n+1}[D\delta_{i,j} + R_{i,j}], \tag{23}$$

$$i = 1, 2, 3, \ldots M, n = 0, 1, 2, 3, \ldots$$

where thermal effusivity E$_i$ depth distribution is identified for i, j=1, 2, 3, ... M uniformly discretized number (1–M) of uniform grids of set size for the entire depth, the superscript n is the iteration number,
p$_j$ is unknown parameter to be solved, and in the first step of the iteration, p$_j^0$=0;
D is a positive constant defining a damping parameter, $\delta_{i,j}$ is the Kronecker delta defined by:

$$\delta_{i,j} = \begin{cases} 1, & \text{if } i = j \\ 0, & \text{if } i \neq j \end{cases}$$

with an inputted number of iterations, and an effusivity is constructed at the 100 depth grids form EQ. 22 as follows:

$$E_i = E(z_i) = \sum_{j=1}^{M} p_j^{n+1} \quad (22)$$

which represent the discretized solution of effusivity.

Then checking whether the loop ended as indicated in a decision block 216. When the loop has not ended, then a next pixel (i, j) loop is obtained at block 210 and the processing continues with the next pixel (i, j) loop. When the loop has ended, then plane and cross-section effusivity images are constructed as indicated in a block 218. This completes the thermal imaging data processing as indicated in a block 220.

In accordance with features of the invention, the problem of depth diffusion is solved. The diffusion of a physical signal with the test material or by a measurement instrument is a common phenomenon involved in many experimental systems. One example is the smeared reading of a time domain signal by an instrument that has a characteristic time response to instantaneous changes, and another is blurring of a photograph taken with a lens that has poor focusing capability. This type of data diffusion can usually be modeled mathematically by a convolution formulation between the true signal and a response function that accounts for all diffusion effects. For thermal imaging, a response function for thermal diffusion has not been developed in the known thermal tomography method, which is not able to remove the diffusion effect that causes resolution degradation. This invention provides for the first time a depth deconvolution algorithm for thermal tomography that can eliminate thermal diffusion in the depth direction. The mathematical formulation is similar to those in conventional deconvolution theories. In the following, the mathematical formulation of the thermal tomography method disclosed in the above-identified U.S. Pat. No. 7,365,330 is reviewed and a quantitative description of its depth resolution is determined. The theoretical development of this invented method including the depth deconvolution algorithm is described in the following.

Theoretical Development of Thermal Tomography Including New Depth Deconvolution Algorithm Theoretical development of this invented method is now described based on typical 1D solutions of the heat conduction equation under pulsed thermal imaging condition. The 1D governing equation for heat conduction in a solid material is represented by the following equation (1):

$$\rho c \frac{\partial T}{\partial t} = \frac{\partial}{\partial z}\left(k \frac{\partial T}{\partial z}\right) \quad (1)$$

where T(z,t) is temperature, $\rho$ is density, c is specific heat, k is thermal conductivity, t is time, z is coordinate in the depth direction, and z=0 is the surface that receives flash heating. It is noted that Eq. (1) contains only two independent thermal parameters, the heat capacity $\rho c$ and the thermal conductivity k, both may vary with depth z, but are treated constant in the following derivations.

Two solutions of the governing Eq. (1) are particularly useful for the development of thermal tomography method: one for a semi-infinite material and the other for a plate with a constant thickness. Under ideal pulsed thermal-imaging conditions, i.e., the pulsed heating is instantaneous and absorbed within a surface layer of negligible thickness and all surfaces of the sample are insulated, the solution of Eq. (1) for a semi-infinite material ($0 \leq z < \infty$) is:

$$T(t) = T(z=0, t) = \frac{Q}{(\rho c k \pi t)^{1/2}} \quad (2)$$

where Q is the pulsed energy absorbed on surface z=0 at t=0, T(t) is the surface temperature that is measured by an infrared detector (a pixel in an infrared image array) during a thermal imaging test. The solution of Eq. (1) for a finite-thickness plate ($0 \leq z \leq L$) is:

$$T(t) = T(z=0, t) = \frac{Q}{\rho c L}\left[1 + 2\sum_{n=1}^{\infty} \exp\left(-\frac{n^2 \pi^2}{L^2}\alpha t\right)\right] \quad (3)$$

where $\alpha(=k/\rho c)$ is thermal diffusivity.

The thermal tomography method disclosed in the above-identified U.S. Pat. No. 7,365,330 included the following three equations:

$$e_a(t) = \frac{Q}{T(t)\sqrt{\pi t}} \quad (4)$$

$$z = (\pi \alpha t)^{1/2} \quad (5)$$

$$e_a(t) = \frac{1}{z}\int_0^z e(z)dz \quad (6)$$

where $e_a(t)$ is the apparent thermal effusivity on sample surface and e(z) is the thermal effusivity within the sample depths. Both $e_a(t)$ and e(z) have the same unit as thermal effusivity $(\rho c k)^{1/2}$. The purpose of a thermal tomography method is to convert the measured time variation of surface temperature T(t) into a depth distribution of the thermal effusivity within the material e(z). It is noted that there is a closed-form solution of e(z) from Eq. (6), $$e(z) = \frac{d[z e_a(t)]}{dz} \quad (7)$$

This thermal tomography method has been demonstrated to be efficient to construct 3D thermal effusivity for a test sample. Because the constructed result is a physical property of the material, it is also effective for analyzing material composition and structure within the sample. The major problem for this method is that its spatial resolution is not constant and typically degrades rapidly with depth. To quantify the depth resolution for this method, the analytical solution of thermal effusivity e(z) for a plate is examined. The effusivity e(z) is derived based on the "measured" surface temperature expressed in Eq. (3) for a plate of a thickness 1 mm and a constant material effusivity $(\rho c k)^{1/2} = 1$. Because the front surface at z=0 is naturally resolved, only the resolution at the back surface at z=1 mm is examined.

Figure 3:
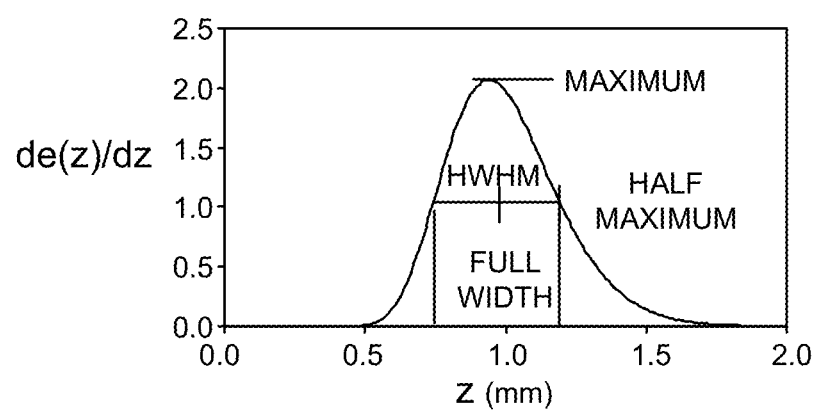
FIG. 3 is a chart illustrating effusivity derivative curve as a function of depth determined from Eq. (6) for a one-layer material with a material effusivity of 1 and a thickness of 1 mm.

Referring to FIG. 3, there is shown an effusivity derivative curve as a function of depth determined from Eq. (6) for a one-layer material with a material effusivity of 1 and a thickness of 1 mm. The resolution at the back surface can be determined from the effusivity derivative curve de(z)/dz as illustrated in FIG. 3. Because the back surface is the only effusivity discontinuity along depth z, i.e., $(\rho ck)^{1/2}=1$ when $0<z<1$ mm and $(\rho ck)^{1/2}=0$ when $z>1$ mm, there should be a single peak of de(z)/dz at z=1 mm if the back surface is resolved exactly. However, the de(z)/dz curve in FIG. 3 has a broader distribution representative of the resolution at depth z=1 mm. The resolution is normally measured quantitatively by the HWHM (half width at half maximum) value, which is found to be 0.23 from FIG. 3. Therefore, the depth resolution for the disclosed tomography method is 0.23z; it degrades linearly with depth. Physically, the resolution represents the depth range within which two separate discontinuities cannot be differentiated by this disclosed method.

The depth resolution of 0.23z for this disclosed tomography method is considered to be poor. First, it makes the identification of the exact depth of a deep interface more difficult. Second, once a deep interface is detected, it is not possible to determine the sharpness of the interface. In addition, the poor resolution will limits the detection sensitivity of deeper features. Therefore, it is necessary to improve the resolution if thermal tomography is to be used for high-resolution imaging applications. However, it is evident that the formulation in Eqs. (4)-(7) do not take into account of the thermal diffusion that causes the resolution degradation so its resolution cannot be further improved. A completely new thermal tomography algorithm is provided by the present invention to improve the resolution.

Because the new algorithm of the invention is developed based on the conventional convolution theory, it is useful to examine the formulation for a conventional convolution problem. A simple convolution problem is the measurement of a time series of a signal u(t) by an instrument that has a characteristic time response r(t) to the signal. The measured signal s(t) is the convolution between the true signal u(t) and the response function r(t) by the following equation:

$$s(t) = \int_{-\infty}^{\infty} u(\tau) r(t-\tau) d\tau \tag{8}$$

Because the true signal u(t) may contain singular points where its value is not continuous, deconvolution solution of Eq. (8) is typically involved with singular-value matrix decomposition or fast Fourier transform with filtering. A successful deconvolution solution should reproduce the true signal u(t) with minimal or no signal smearing or blurring. The 1D Eq. (8) can be easily extended into a 2D equation that is relevant to image restoration and enhancement.

In thermal imaging, the surface temperature measured by an infrared camera should also be related to a convolution between a thermal diffusion process and the true material property distribution under surface. This relationship should be similar to that described in Eq. (8), i.e., the surface temperature is related to the measured signal s, the thermal diffusion is characterized by a response function r, and the material's thermal effusivity corresponds to the true signal u. However, there are no theories for such a relationship and a "response function" for thermal diffusion has not been established. Because the depth resolution in thermal tomography is not constant, the thermal "response function" may also change with depth, although it should have a unique characteristic shape because the depth resolution is a unique function of depth. Based on these observations, a convolution formulation as well as a response function for thermal tomography can be derived from a special case. Such a formulation should be applicable to all cases because of the uniqueness of the fundamental thermal convolution process.

The convolution formulation and the response function for the new algorithm are derived based on the solution for a plate sample, Eq. (3). For a plate sample of thickness L, the true thermal effusivity distribution as a function of depth E(z) is:

$$E(z) = \begin{cases} \sqrt{\rho ck}, & 0 < z < L \\ 0, & z > L \end{cases} \tag{9}$$

By inserting Eq. (3) into Eq. (4), the apparent effusivity is expressed as:

$$e_a(t) = \frac{Q}{T(t)\sqrt{\pi t}} = \frac{\sqrt{\rho ck}}{\frac{z}{L}\left[1 + 2\sum_{n=1}^{\infty} \exp\left(-n^2 \pi^2 \frac{z^2}{L^2}\right)\right]} \tag{10}$$

In the right-hand-side term in Eq. (10), time t has been converted into depth z based on Eq. (5). This term is only a function of the ratio z/L. A new function R(z/l) can be defined as:

$$R(z/l) = \frac{1}{\frac{z}{l}\left[1 + 2\sum_{n=1}^{\infty} \exp\left(-n^2 \pi^2 \frac{z^2}{l^2}\right)\right]} \tag{11}$$

It can be seen that:

$$R(z/l) = \frac{e_a(t)}{\sqrt{\rho ck}} \tag{12}$$

when l=L. Because E(z) in Eq. (9) is the true effusivity distribution, $e_a(t)$ in Eq. (10) is the measured apparent effusivity, and the function R(z/l) in Eq. (11) is related to the diffusion at an interface at l, these three variables play similar roles as those in Eq. (8) from a mathematical viewpoint. Therefore, based on the format of Eq. (8), an integral formulation may be constructed to relate these three variables:

$$e_a(z) = \int_0^\infty E(l) \frac{\partial R(z/l)}{\partial l} dl = \int_0^\infty E(l) r(z/l) dl \tag{13}$$

It can be easily verified that Eq. (13) is an identity equation based on the expressions of individual variables in Eqs. (9)-(12). In addition, Eq. (13) determines a response function r(z/l):

$$r(z/l) = \frac{\partial R(z/l)}{\partial l} = \frac{1 + 2\sum_{n=1}^{\infty} \exp\left(-n^2\pi^2 \frac{z^2}{l^2}\right) - \frac{4\pi \frac{z^2}{l^2} \sum_{n=1}^{\infty} n^2 \exp\left(-n^2\pi^2 \frac{z^2}{l^2}\right)}{z\left[1 + 2\sum_{n=1}^{\infty} \exp\left(-n^2\pi^2 \frac{z^2}{l^2}\right)\right]^2}}{} \quad (14)$$

Figure 4:
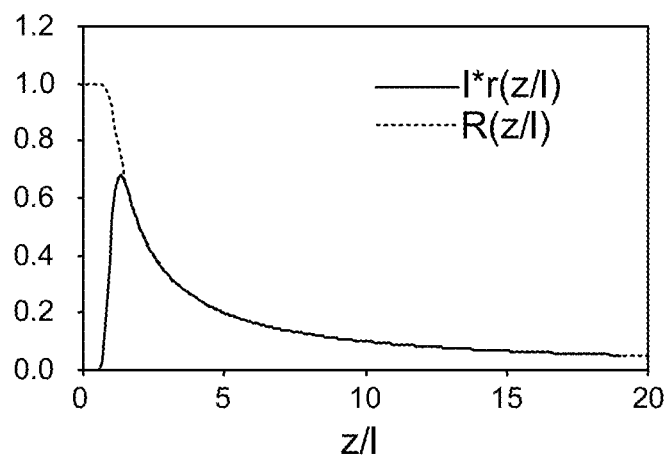
FIG. 4 is a chart illustrating example variables $l^*r(z/l)$ and $R(z/l)$ as function of z/l in the new thermal tomography algorithm in accordance with the preferred embodiment.

Referring now to FIG. 4, a chart illustrating example variables $l*r(z/l)$ and $R(z/l)$ as function of $z/l$ in the new thermal tomography algorithm in accordance with the preferred embodiment. Equation (13) is the convolution formulation between the measured apparent effusivity $e_a(z)$ and the true material effusivity $E(z)$. In deriving this formulation, the response function $r(z/l)$ is also obtained. This response function should have accounted for the diffusion effect at an interface with a discontinuity from $(\rho c k)^{1/2}$ to zero, and it can be used for all applications with such discontinuities. From Eqs. (14) and (11), it is seen that the variables $l*r(z/l)$ and $R(z/l)$ are both nondimensional functions of $z/l$, their profiles are plotted in FIG. 4.

Equation (13) is the general formulation of this new invented algorithm for thermal tomography reconstruction of 3D thermal effusivity. In this equation, the left-hand-side term $e_a(z)$ is a known variable obtained from experiment (see Eq. (4)), the response function $r(z/l)$ is given in Eq. (14), and the unknown effusivity distribution $E(z)$ is determined from a deconvolution solution of Eq. (13).

Because Eq. (13) is an identity equation for a plate sample, it should reproduce the true effusivity distribution $E(z)$ given in Eq. (9) if Eq. (13) can be solved exactly. In reality, the solution of Eq. (13) has to be carried out numerically by a computer. Numerical solution of Eq. (13) however is problematic because once discretized, Eq. (13) becomes a matrix formulation with the matrix constructed from the response function being singular (i.e., zero determinant). Although singular value decomposition can be used to solve such equations, the solution typically has significant oscillations around the discontinuity point because all high-frequency components are neglected due to their small magnitudes. Therefore, it is necessary to modify Eq. (13) so a deconvolution solution can be obtained accurately and reliably.

In accordance with features of the invention, the singularity in Eq. (13) can be easily removed when a positive constant D, a "damping" parameter, is added to both sides of the equation. The resulting expression is $$e_a(z) + DE(z) = \int_{-\infty}^{\infty} E(l)[D\delta(z-l) + r(z/l)]dl \quad (15)$$

where $\delta(z)$ is the Dirac delta function defined by:

$$\delta(z) = \begin{cases} \infty, & z = 0 \\ 0, & z \neq 0 \end{cases} \quad (16)$$

and $$\int_{-\infty}^{\infty} \delta(z)dz = 1$$

Equation (15) does not have the singular-value problem in its discretized formulation, so it may be used to establish the final formulation for numerical deconvolution solution. In discretized form, the space variables z and l are discretized uniformly into M grids of size $\Delta$ for the entire imaged depth:

$$z_i = i\Delta, l_j = j\Delta, dl = \Delta, i,j = 1,2,3,\ldots M \quad (17)$$

In conjunction with this discretization, the unknown effusivity is expressed in the following form:

$$E(l) = \sum_{j=1}^{M} H(l_j - l)p_j \quad (18)$$

where $p_j$ is unknown parameter to be solved and $H(l_j-l)$ is similar to a Heaviside function (or a step function) defined by:

$$H(l_j - l) = \begin{cases} 1, & \text{if } 0 < l < l_j \\ 0, & \text{if } l > l_j \end{cases} \quad (19)$$

One advantage for using the expression in Eq. (18) is that if the imaged sample is a plate, only one term in the summation has a non-zero parameter. Another advantage is that the discretized formulation will use the function $R(z/l)$ from Eq. (11) instead of the response function $r(z/l)$ that has a more complex form. By substituting Eq. (18) into Eq. (15), the following discretized formulation is obtained:

$$e_{a,i} + Dp_i = \sum_{j=1}^{M} p_j[D\delta_{i,j} + R_{i,j}], \quad i = 1, 2, 3, \ldots M. \quad (20)$$

Here $e_{a,i} = e_a(z_i)$, $R_{i,j} = R(z_i/l_j)$, $\delta_{i,j}$ is the Kronecker delta defined by:

$$\delta_{i,j} = \begin{cases} 1, & \text{if } i = j \\ 0, & \text{if } i \neq j \end{cases} \quad (21)$$

and the discretized solution of effusivity becomes:

$$E_i = E(z_i) = \sum_{j=1}^{M} p_j \quad (22)$$

The matrix $[D\delta_{i,j} + R_{i,j}]$ in Eq. (20) is not singular, so can be inverted using various matrix solution algorithms. It can be demonstrated (as shown later) that if the correct parameters $p_j$ are known, e.g., from the plate solution in Eq. (3), and used in the left-hand-side term $Dp_j$, the above equation reproduces the exact solution of $p_j$ from the right-hand side. However, the parameters $p_j$ in the left-hand side are normally unknown. To approximate these unknown parameters, an iterative solution procedure is used:

$$e_{a,i} = Dp_i^n = \sum_{j=1}^{M} p_j^{n+1}[D\delta_{i,j} + R_{i,j}], \quad (23)$$

$$i = 1, 2, 3, \ldots M, n = 0, 1, 2, \ldots ,$$

where the superscript n is the iteration number and in the first step of the iteration, $p_j^0 = 0$. Equation (23) is the final formulation used for deconvolution solution of the effusivity's depth distribution. Although iteration is an approximate solution procedure, it may converge to the exact solution if the iteration procedure is appropriately implemented. Based on the studies for a plate with one or two-layer materials, it was found that if the depth variable z is multiplied to the left-hand-side term $Dp_j$, Eq. (23) may produce stable solutions that converge to a nearly-exact solution.

In summary, this invented depth deconvolution algorithm provides a new formulation and solution procedure to construct 3D thermal effusivity data that have no resolution degradation with depth. This new algorithm is consistent with conventional deconvolution theory and provides significant improvement over the above-identified U.S. Pat. No. 7,365, 330. It consists of three components: (1) derivation of a response function, (2) construction of a convolution formulation, and (3) implementation of a deconvolution solution procedure. The response function represents how much diffusion is present in the heat transfer process, and is derived based on the theoretical 1D solution for a plate under pulsed thermal-imaging condition. The convolution formulation relates the measured surface temperature data to the convolution of material's internal effusivity and the response function. The convolution formulation is an identity equation for thermal imaging of a plate specimen; it therefore should yield exact solution of effusivity's depth distribution under this condition. The deconvolution solution for thermal effusivity is based on an iterative procedure because the original convolution formulation leads to a singular-value matrix that results in solution oscillations at the singularity depth (back surface of the plate) if a direct matrix inversion method is used. The iterative solution procedure introduces the damping parameter D to facilitate matrix inversion to obtain the exact solution as to be demonstrated in the following sections.

Validation Examples

Figure 5:
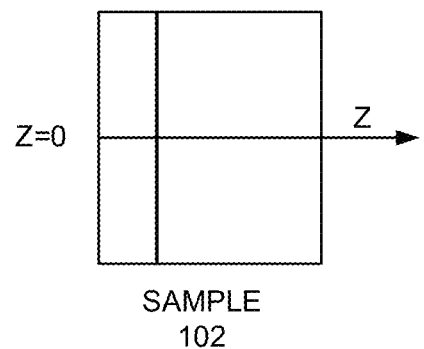
FIG. 5 illustrates an example two-layer material sample used in the new thermal tomography algorithm in accordance with the preferred embodiment.

Referring now to FIG. 5, there is shown an example two-layer material sample 102 used in the new thermal tomography algorithm in accordance with the preferred embodiment. The invented new thermal-tomography algorithm is validated using one and two-layered materials as illustrated in FIG. 5. The emphasis is to examine the resolution at the back surface from the solutions of the convolution equation (23). To perform the numerical solutions, two sets of material properties, identified as materials no. 1 and 2, are used and listed in Table 1.

TABLE 1

List of thermal properties for two postulated materials used in examples

| Material no. | Conductivity k (W/m-K) | Heat capacity ρc (J/m³-K) | Diffusivity α (mm²/s) | Effusivity e (J/m²-K-s$^{1/2}$) |
|---|---|---|---|---|
| 1 | 2 | 2 × 10$^6$ | 1 | 2000 |
| 2 | 4 | 4 × 10$^6$ | 1 | 4000 |

Figure 6:
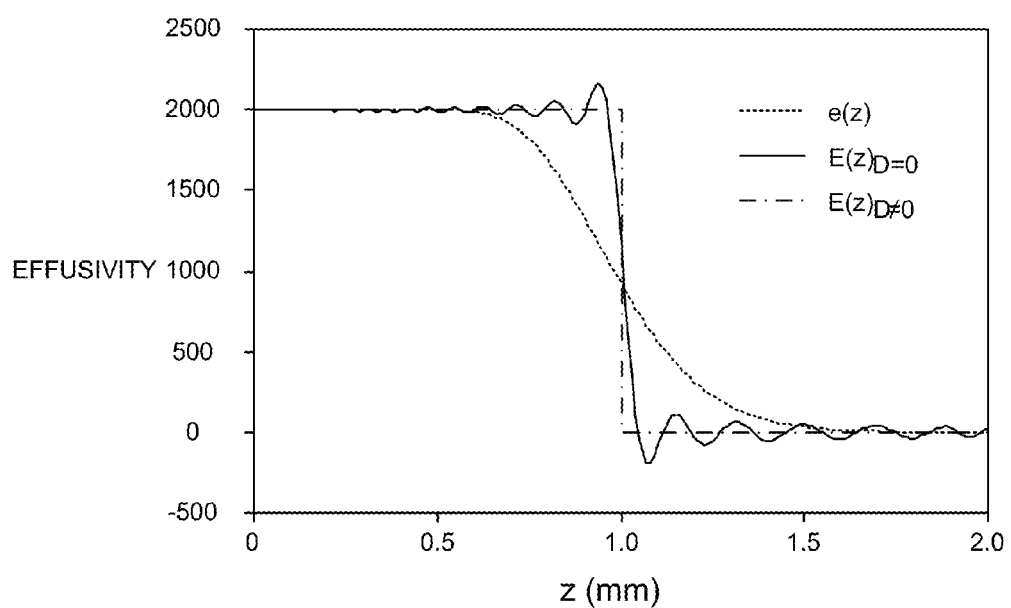
FIG. 6 is a chart illustrating example thermal effusivity as a function of depth obtained from the new thermal tomography algorithm for a plate of thickness of 1 mm in accordance with the preferred embodiment for comparison with thermal effusivity obtained from a prior art system.

Referring now to FIG. 6, there is shown an example thermal effusivity as a function of depth obtained from the new thermal tomography algorithm for a plate of thickness of 1 mm in accordance with the preferred embodiment for comparison with thermal effusivity obtained from a prior art system. The solution e(z) from the prior art method has poor resolution at the back surface of the plate at z=1 mm. The new method normally produces oscillations as displayed in the $E(z)_{D=0}$ curve. However, under an ideal condition, it can reproduce the exact solution $E(z)_{D \neq 0}$.

For a single-layer material, because the front surface is naturally resolved and the material property is constant, the performance of the new algorithm is evaluated based on the depth resolution at the back surface. The plate is assumed to be material no. 1 as listed in Table 1 and has a thickness L=1 mm. The theoretical solution of surface temperature T(t) from Eq. (3) is used to calculate the apparent effusivity in Eq. (4). FIG. 6 shows the material effusivity solutions as a function of depth z obtained from Eqs. (7) and (23). The effusivity e(z) is obtained by the old tomography formulation Eq. (7) and shows significant "diffusion" at the discontinuous boundary of back surface at L=1 mm. Two effusivity solutions are obtained from the new formulation Eq. (23). The effusivity solution $E(z)_{D=0}$ obtained with D=0 considerably reduces the diffusion effect at the back surface, but it introduces oscillations that span the entire depth domain around the discontinuity depth. The effusivity solution $E(z)_{D \neq 0}$, obtained with D≠0 and the exact $p_j$'s in the left-hand-side term in Eq. (23), reproduces the exact effusivity profile for this one-layer material. These results therefore verify that the new depth deconvolution algorithm can eliminate all diffusion and reproduce the exact solution at a discontinuity depth.

Figure 7:
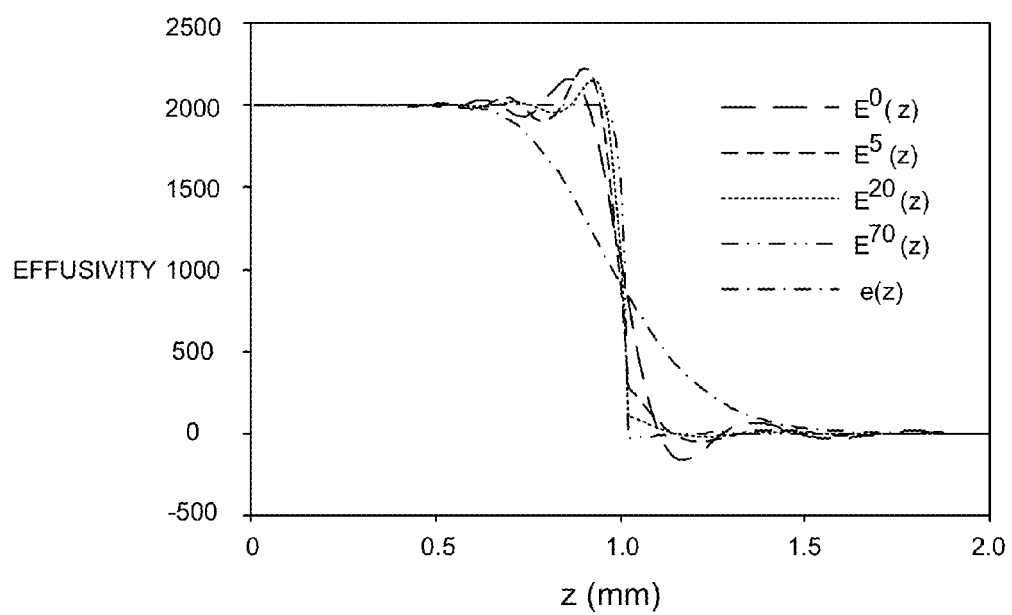
FIG. 7 is a chart illustrating example thermal effusivity as a function of depth obtained from the new thermal tomography algorithm Eq. (23) with D=0.0001 for a one-layer material in accordance with the preferred embodiment.
Figure 8:
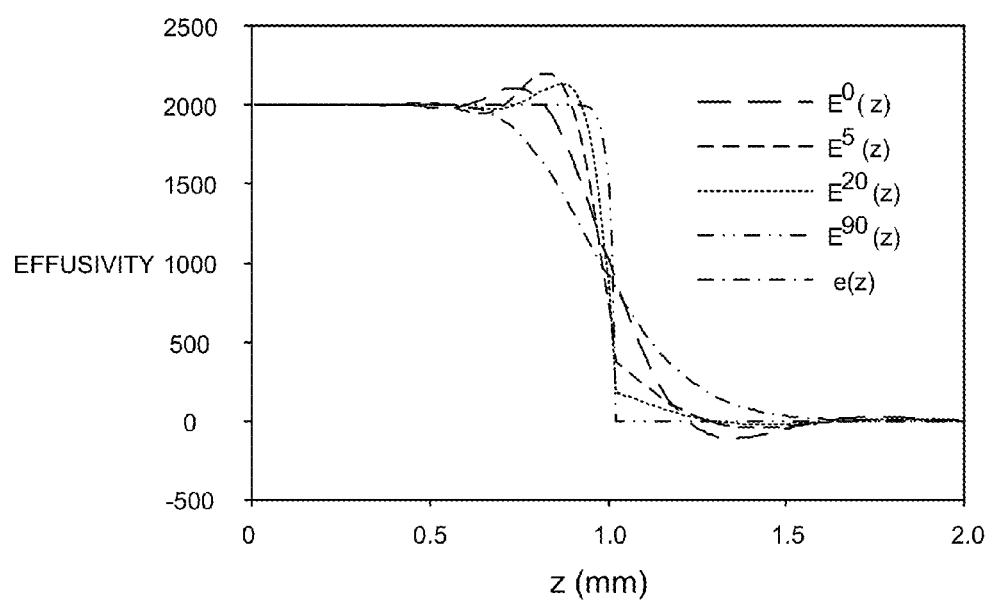
FIG. 8 is a chart illustrating example thermal effusivity as a function of depth obtained from the new thermal tomography algorithm Eq. (23) with D=0.1 for a one-layer material in accordance with the preferred embodiment.

Referring now to FIG. 7, there is shown an example thermal effusivity as a function of depth obtained from the new thermal tomography algorithm Eq. (23) with D=0.0001 for a one-layer material in accordance with the preferred embodiment. In practice, the new effusivity solution $E(z)_{D=0}$ is not desirable because of the excessive oscillations, while the exact effusivity solution $E(z)_{D \neq 0}$ cannot be obtained without a prior knowledge of the exact solution. Iteration solution procedure of Eq. (23) therefore has to be used in all practical applications. To perform iteration solution, an appropriate parameter D has to be selected because it determines the oscillation intensity as well as the depth resolution. In FIGS. 7 and 8, two sets of iteration solutions from Eq. (23) are presented based on two values of the parameter D. FIG. 7 shows the effusivity solutions at various iteration numbers with D=0.0001. These solutions show stronger oscillations; but they converge to a solution very close to the exact solution with 70 iterations.

Referring now to FIG. 8, there is shown an example thermal effusivity as a function of depth obtained from the new thermal tomography algorithm Eq. (23) with D=0.1 for a one-layer material in accordance with the preferred embodiment. FIG. 8 shows the solutions with a larger parameter D=0.1. These solutions show weaker oscillations and also converge to a nearly exact solution at iteration number of 90. The slight deviations in these solutions to exact are due to the nature of the iterative solution procedure and the discretized formulation Eq. (23). Because it is usually more desirable to have a solution with less oscillations, D=0.1 is selected as the standard value for the parameter D in the following analyses.

Figure 9:
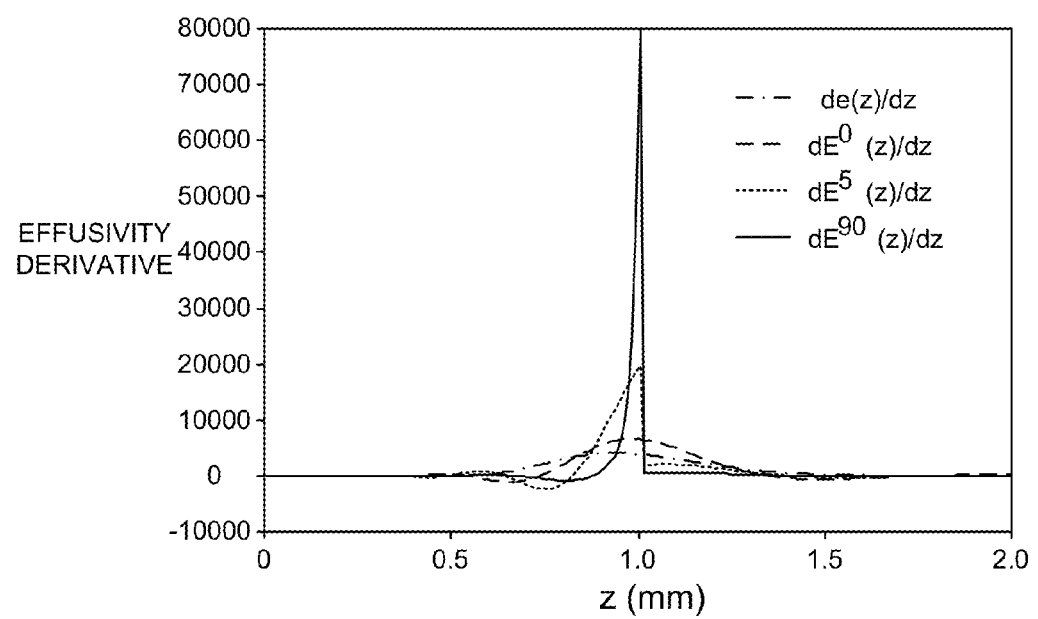
FIG. 9 is a chart illustrating example thermal effusivity-derivative profiles as a function of depth determined from the curves of FIG. 8 in accordance with the preferred embodiment.

Referring now to FIG. 9, there is shown an example thermal effusivity-derivative profiles as a function of depth determined from the curves of FIG. 8 in accordance with the preferred embodiment. The spatial resolution of the new algorithm can be assessed based on the effusivity derivative dE/dz. FIG. 9 shows effusivity derivatives as a function of depth from the solutions plotted in FIG. 8. The depth resolution characterized by HWHM for the old tomography algorithm has been determined to be 0.23z from the de(z)/dz curve. The depth resolution for the new algorithm continuously improves with iterations, resulting in a small HWHM value limited by the discretization grid size α in Eq. (17) (Δ=0.01 mm for the FIG. 9 curves). Therefore, the resolution of this new algorithm does not degrade with depth, limited only by the experimental data accuracy and discretization errors in the numerical calculation.

Figure 10:
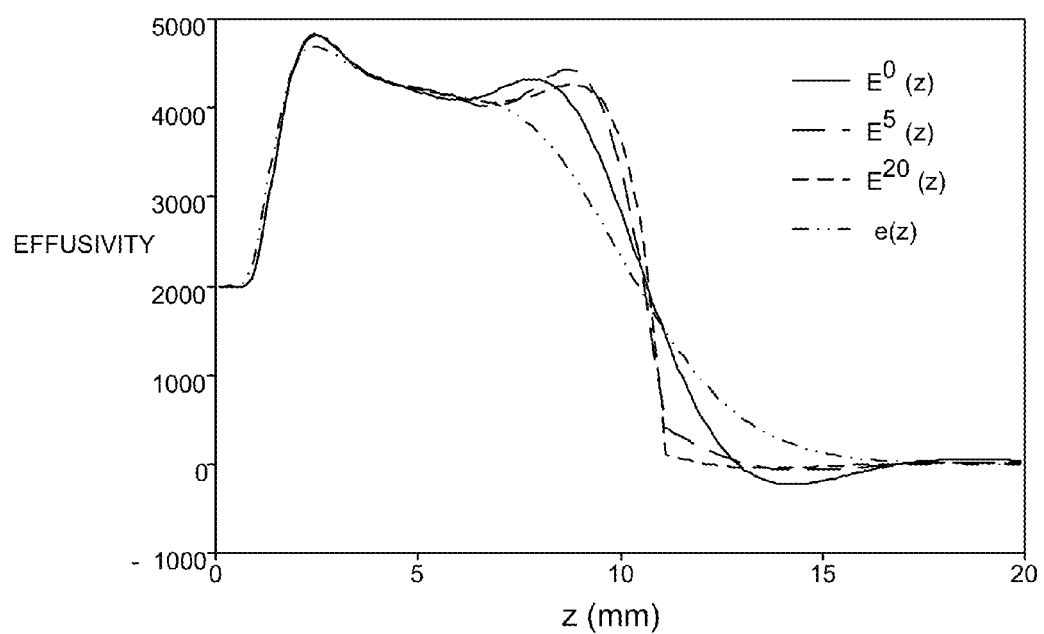
FIG. 10 is a chart illustrating example thermal effusivity profiles as a function of depth obtained from the new thermal tomography algorithm Eq. (23) with D=0.1 for a two-layer material in accordance with the preferred embodiment.

Referring now to FIG. 10, there is shown an example thermal effusivity profiles as a function of depth obtained from the new thermal tomography algorithm Eq. (23) with D=0.1 for a two-layer material in accordance with the preferred embodiment. The new algorithm is also used to analyze two-layered materials. The first layer is assumed to contain material no. 1 listed in Table 1 with a thickness of 1 mm and the second layer contains material no. 2 with a thickness of 10 mm. The governing equation (1) for this two-layer material system is solved numerically to obtain the surface temperature data T(t) under pulsed thermal imaging condition, using the numerical method described in U.S. patent application Ser. No. 11/452,052 filed Jun. 13, 2006 by the present inventor and entitled METHOD FOR ANALYZING MULTI-LAYER MATERIALS FROM ONE-SIDED PULSED THERMAL IMAGING. FIG. 10 shows the effusivity solutions from Eq. (23) with various iteration numbers and the parameter D=0.1. The oscillations near the back surface at z=11 mm are generally weaker, and the back surface is resolved much better than the solution from the old tomography method. However, the current computer program can only enhance one interface or discontinuity at each calculation. The interface between the layers is not enhanced, but this can be done with further development of the computer program.

Figures 11A, 11B:
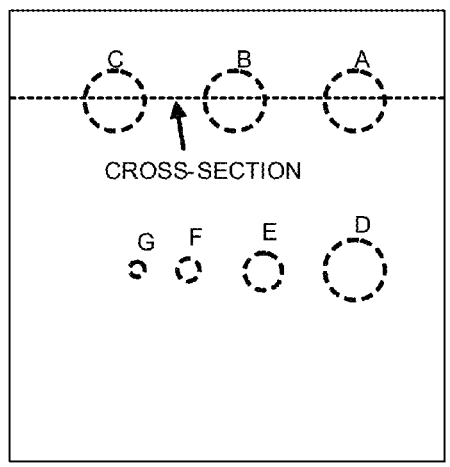
FIGS. 11A and 11B illustrate an example flat-bottom-hole plate with example hole dimensions.

FIGS. 11A and 11B illustrate an example flat-bottom-hole plate with example hole dimensions. A SiC/SiNC ceramic matrix composite plate with machined flat-bottom holes is used to evaluate the new thermal tomography algorithm as compared with the old algorithm. This plate is 5 cm×5 cm in size, and its thickness varies from 2.3 to 2.7 mm. Seven flat-bottom holes (Holes A-G) of various diameters and depths were machined from the back surface, as illustrated in FIG. 11A. The depths of the holes, listed in FIG. 11B, refer to the distance from the hole bottoms to the front surface where pulsed thermal-imaging data were taken. The composite plate was not completely densified so it contains distributed defects and porosities within its volume.

Figure 12A:
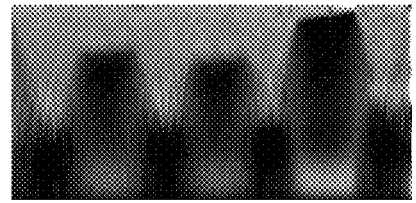
FIGS. 12A and 12B illustrate predicted thermal effusivity images using the new algorithm Eq. (23) with 1 and 5 solution iterations at the cross section of flat-bottom-hole plate as illustrated in FIG. 11A in accordance with the preferred embodiment.
Figure 12B:
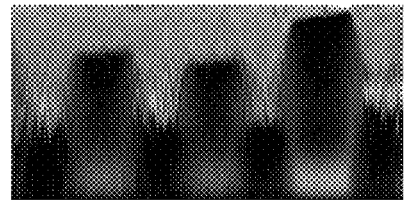

FIGS. 12A and 12B illustrate predicted thermal effusivity images using the new algorithm Eq. (23) with 1 and 5 solution iterations at the cross section of flat-bottom-hole plate as illustrated in FIG. 11A in accordance with the preferred embodiment. Experimental data (surface temperature images) were obtained from the front surface of the plate using a one-sided pulsed thermal-imaging system. In order to obtain accurate measurements for the entire thermal transient, an optical filter was used to eliminate the infrared radiation from the flash lamps as disclosed in the above-identified U.S. Pat. No. 7,538,938 issued May 29, 2009 to the present inventor. The imaging rate was 516 Hz, and a total of 3000 frames were taken for a test duration of 5.8 s. Thus, at each surface pixel (i, j), its surface temperature T(t) was acquired for a total of 3000 time steps with a time increment of 1/516=0.0019 s. The temperature data T(t) is converted to the apparent effusivity $e_a(t)$ by Eq. (4), which is then deconvolved into effusivity e(z) by the old algorithm Eq. (7) and effusivity E(z) by the new algorithm Eqs. (23) and (18). In solution for E(z), various iterations can be used. Based on the material properties for this sample, the total imaged depth is 4.1 mm as determined by Eq. (5). Once the deconvolution solutions are calculated for all pixels and composed together, thermal effusivity distribution in the entire 3D volume of the plate is obtained. The 3D effusivity data can be sliced in arbitrary planes (such as lateral or cross-sectional slices) to examine the internal material property distribution. The data processing is very fast, typically within a minute for deriving the entire volume data with both old and new algorithms.

The new images in FIGS. 12A, 12B show clearly the depth of the bottom surface of the holes as well as the back surface of the plate. The back-surface boundary is sharper in the image obtained with 5 iterations. Because effusivity is more uniform in the interior of the plate in these new images, defective features (those with darker grayscale) become more apparent. The new images in FIGS. 12A, 12B also show a rougher back surface, which is due to the noise in the experimental data.

Figure 13:
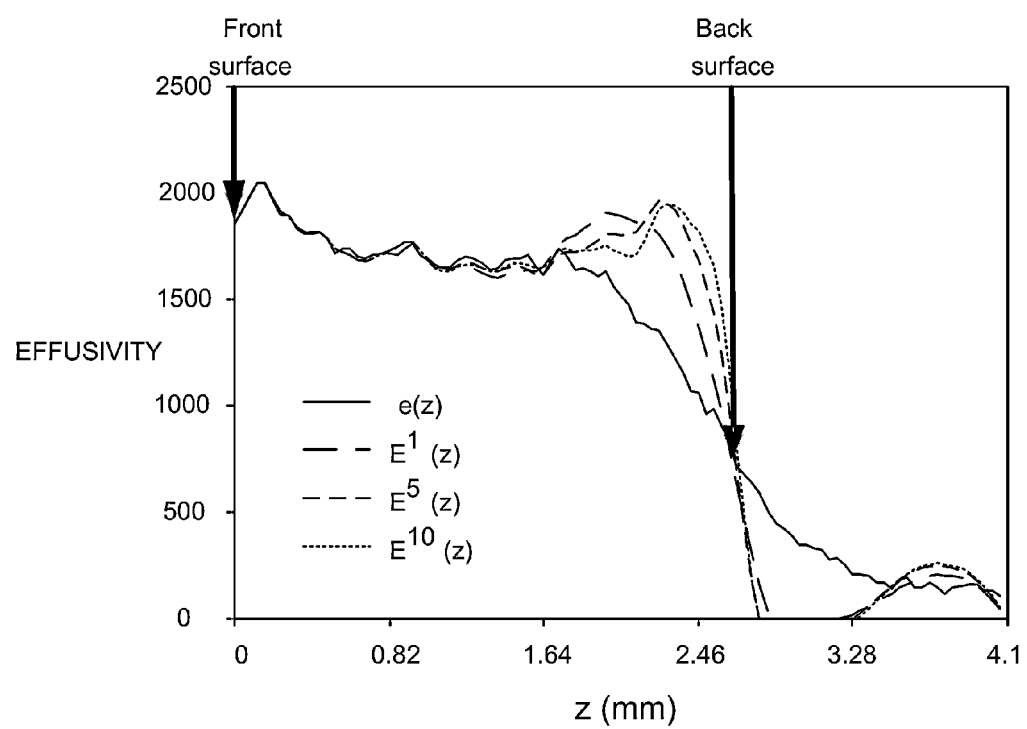
FIG. 13 is a chart illustrating example effusivity profiles as function of depth obtained by the old algorithm e(z) and the new algorithm E(z) with various solution iterations at a pixel that passes the back surface of the flat-bottom-hole plate in accordance with the preferred embodiment.

Referring now to FIG. 13, there is shown an example effusivity profiles as function of depth obtained by the old algorithm e(z) and the new algorithm E(z) with various solution iterations at a pixel that passes the back surface of the flat-bottom-hole plate in accordance with the preferred embodiment. FIGS. 12A, 12B shows two effusivity images obtained by the new invented algorithm Eq. (23) with 1 and 5 solution iterations respectively.

To further quantify the improvement in depth resolution, the effusivity profiles as a function of depth obtained by the old and new algorithms at a single pixel that passes the back surface are plotted in FIG. 13. It is evident that the effusivity profile e(z) obtained by the old algorithm displays significant diffusion at the back-surface depth at ~2.6 mm. All effusivity profiles E(z) obtained by the new algorithm with different solution iterations show good resolution (i.e., sharp boundary) at the back surface of the plate. The depth resolution is improved mostly during the first few iterations. In addition to the resolution improvement, another important observation of these results is that the solution method developed in this invention is stable; as deconvolution methods typically have solution convergent problems.

In brief summary, thermal tomography can construct 3D volume data of material's thermal effusivity using the experimental data acquired from one-sided pulsed thermal imaging. Based on the 3D thermal effusivity data, the distributions of material composition, structure, and presence of internal flaws within the volume of a test sample can be easily analyzed. The prior art thermal tomography method of the above-identified U.S. Pat. No. 7,365,330 has a simple 3D construction algorithm that does not account for the thermal diffusion effect that causes linear degradation of spatial resolution with depth. This invention provides for the first time a depth deconvolution algorithm for thermal tomography that can completely eliminate thermal diffusion around a discontinuity in the depth direction. This new algorithm is consistent with conventional convolution theories, it therefore allows for easy incorporation of new theoretical models and implementation of other solution procedures developed in conventional deconvolution theories. It includes (1) the derivation of a response function, (2) construction of a convolution formulation, and (3) implementation of a deconvolution solution procedure. The response function represents how much diffusion is present in the heat transfer process. The convolution formulation relates the measured surface temperature data with the convolution of material's internal effusivity and the response function. Both the response function and convolution formulation are derived based on the theoretical 1D solution for a plate under pulsed thermal-imaging condition. This convolution formulation is therefore an identity equation for thermal tomography reconstruction of a plate sample. The deconvolution solution is based on an iteration procedure because the original convolution formulation leads to a singular-value matrix that results in solution oscillations if a direct matrix inversion method is used. The damping parameter D is introduced in the formulation to remove the singularity and to obtain the exact solution.

The new algorithm of the invention is evaluated in several example calculations. For a single-layer material, it may reproduce the exact solution of effusivity depth distribution if the solution can be included in the known variable. In practical applications where the solution is not known beforehand, iteration solution procedure is used. The convergence of iteration solutions is dependent on the value of the "damping" parameter D. Based on the results, a large value of D=0.1 is selected because it produces weaker oscillations. Because the iteration solution does converge to a nearly-exact solution, the depth resolution of the new algorithm will not degrade with depth, limited only by the experimental data accuracy and discretization errors in the numerical calculation. For two-layer materials, the current solution procedure only enhances one interface at each calculation. Optimization of the solution procedure may provide enhanced solutions for multilayer materials.

The new algorithm of the invention is also demonstrated to produce high-resolution 3D thermal-effusivity images from experimental data for a ceramic composite plate with machined flat-bottom holes. The new images show clearly the depth of the bottom surface of the holes as well as the back surface of the plate, which cannot be easily determined by the old algorithm. The new algorithm of the invention also generates a more uniform effusivity in the interior of the plate, so the flaw features become more apparent in the new images. This new algorithm is therefore stable, accurate, and capable to produce high-resolution 3D imaging data for all depths. Similar to the old algorithm, this new algorithm also does not require calibration and is fully automated, and may process a typical set of experimental data in about a minute.

While the present invention has been described with reference to the details of the embodiments of the invention shown in the drawing, these details are not intended to limit the scope of the invention as claimed in the appended claims.

What is claimed is:

1. A computer-implemented method for implementing thermal tomography three-dimensional (3D) thermal effusivity imaging comprising:
   acquiring experimental thermal imaging data;
   using a data acquisition and control computer, deriving a response function and constructing a convolution formulation using the experimental thermal imaging data;
   performing a deconvolution solution process including:
      calculating an apparent effusivity function, and
      solving a matrix solution equation with a damping parameter with a selected number of iterations to construct a plurality of effusivity images.

2. The computer-implemented method for implementing thermal tomography three-dimensional (3D) thermal effusivity imaging as recited in claim 1 wherein acquiring experimental thermal imaging data includes providing an input of heat with a flash lamp onto one surface of a sample.

3. The computer-implemented method for implementing thermal tomography three-dimensional (3D) thermal effusivity imaging as recited in claim 2 includes measuring a transient temperature decay on said one surface of the sample.

4. The computer-implemented method for implementing thermal tomography three-dimensional (3D) thermal effusivity imaging as recited in claim 1 wherein acquiring experimental thermal imaging data includes utilizing an infrared camera, acquiring a series of thermal images responsive to a pulse of thermal energy heating a first surface of a sample.

5. The computer-implemented method for implementing thermal tomography three-dimensional (3D) thermal effusivity imaging as recited in claim 1 wherein deriving a response function and constructing a convolution formulation using the experimental thermal imaging data includes converting measured time variation of surface temperature into a depth distribution of thermal effusivity within a sample.

6. The computer-implemented method for implementing thermal tomography three-dimensional (3D) thermal effusivity imaging as recited in claim 1 wherein deriving a response function and constructing a convolution formulation using the experimental thermal imaging data includes identifying thermal effusivity distribution as a function of depth is represented by E(z) and $$E(z) = \begin{cases} \sqrt{\rho c k}, & 0 < z < L \\ 0, & z > L \end{cases}$$

where z represents depth and L represents thickness of the sample, $\rho$ is density, c is specific heat, k is thermal conductivity, z is coordinate in the depth direction, and z=0 is the sample surface receiving heating.

7. The computer-implemented method for implementing thermal tomography three-dimensional (3D) thermal effusivity imaging as recited in claim 1 wherein deriving a response function and constructing a convolution formulation using the experimental thermal imaging data includes calculating a function R(z/l) represented by $$R(z/l) = \frac{1}{\frac{z}{l}\left[1 + 2\sum_{n=1}^{\infty} \exp\left(-n^2\pi^2\frac{z^2}{l^2}\right)\right]}$$

where z is coordinate in the depth direction, and z=0 is the sample surface receiving heating, and the function R(z/l) is related to diffusion at an interface at l.

8. The computer-implemented method for implementing thermal tomography three-dimensional (3D) thermal effusivity imaging as recited in claim 7 includes constructing a matrix $[D\delta_{i,j}+R_{i,j}]$ where D is a positive constant defining a damping parameter,
   where $R_{i,j}=R(z_i/l_j)$,
   $\delta_{i,j}$ is represented by:

$$\delta_{i,j} = \begin{cases} 1, & \text{if } i = j \\ 0, & \text{if } i \neq j \end{cases}$$

$\delta_{i,j}$ is the Kronecker delta.

9. The computer-implemented method for implementing thermal tomography three-dimensional (3D) thermal effusivity imaging as recited in claim 1 wherein performing a deconvolution solution process includes calculating an apparent effusivity function represented by:

$$e_a(t) = \frac{Q}{T(t)\sqrt{\pi t}}$$

where Q is the pulsed energy absorbed on surface z=0 at t=0, T(t) is the surface temperature that is measured by an infrared detector during a thermal imaging test.

10. The computer-implemented method for implementing thermal tomography three-dimensional (3D) thermal effusivity imaging as recited in claim 1 wherein performing a deconvolution solution process includes solving said matrix solution equation represented by $$e_{a,i} = Dp_i^n = \sum_{j=1}^{M} p_j^{n+1}[D\delta_{i,j} + R_{i,j}],$$

$$i = 1, 2, 3, \ldots M, n = 0, 1, 2, 3, \ldots$$

where thermal effusivity $E_i$ depth distribution is identified by $$E_i = \sum_{j=i}^{M} p_j^{n+1}$$

for i, j=1, 2, 3, ... M uniformly discretized number (1–M) of uniform grids of set size for an entire depth of a sample,
the superscript n is the iteration number,
$p_j$ is unknown parameter to be solved, and in the first step of the iteration, $p_j^0=0$;
D is a positive constant defining a damping parameter,
$\delta_{i,j}$ is represented by:

$$\delta_{i,j} = \begin{cases} 1, & \text{if } i = j \\ 0, & \text{if } i \neq j \end{cases}$$

$\delta_{i,j}$ is the Kronecker delta.

11. An apparatus for implementing thermal tomography three-dimensional (3D) thermal effusivity imaging comprising:
a flash lamp applying a pulse of thermal energy heating a first surface of a sample;
an infrared camera acquiring experimental thermal imaging data responsive to said pulse of thermal energy for heating the first surface of the sample;
a data acquisition and control computer, said data acquisition and control computer deriving a response function and constructing a convolution formulation using the experimental thermal imaging data;
said data acquisition and control computer performing a deconvolution solution process including:
calculating an apparent effusivity function, and
solving a matrix solution equation with a damping parameter with a selected number of iterations to construct a plurality of effusivity images.

12. The apparatus for implementing thermal tomography three-dimensional (3D) thermal effusivity imaging as recited in claim 11 wherein said infrared camera acquires a series of thermal images responsive to said pulse of thermal energy heating a first surface of a sample.

13. The apparatus for implementing thermal tomography three-dimensional (3D) thermal effusivity imaging as recited in claim 11 wherein said data acquisition and control computer includes a control program embodied in a machine readable medium and storing a depth deconvolution algorithm; said control program used for controlling said data acquisition and control computer for constructing effusivity images.

14. The apparatus for implementing thermal tomography three-dimensional (3D) thermal effusivity imaging as recited in claim 11 wherein said data acquisition and control computer deriving a response function and constructing a convolution formulation using the experimental thermal imaging data includes said data acquisition and control computer converting measured time variation of surface temperature into a depth distribution of thermal effusivity within a sample.

15. The apparatus for implementing thermal tomography three-dimensional (3D) thermal effusivity imaging as recited in claim 11 wherein said data acquisition and control computer deriving a response function and constructing a convolution formulation using the experimental thermal imaging data includes said data acquisition and control computer identifying thermal effusivity distribution as a function of depth is represented by
E(z) and $$E(z) = \begin{cases} \sqrt{\rho c k}, & 0 < z < L \\ 0, & z > L \end{cases}$$

where z represents depth and L represents thickness of the sample, $\rho$ is density, c is specific heat, k is thermal conductivity, z is coordinate in the depth direction, and z=0 is the sample surface receiving heating.

16. The apparatus for implementing thermal tomography three-dimensional (3D) thermal effusivity imaging as recited in claim 11 wherein said data acquisition and control computer deriving a response function and constructing a convolution formulation using the experimental thermal imaging data includes said data acquisition and control computer calculating a function R(z/l) represented by $$R(z/l) = \frac{1}{\frac{z}{l}\left[1 + 2\sum_{n=1}^{\infty} \exp\left(-n^2\pi^2\frac{z^2}{l^2}\right)\right]}$$

where z is coordinate in the depth direction, and z=0 is the sample surface receiving heating, and the function R(z/l) is related to diffusion at an interface at l.

17. The apparatus for implementing thermal tomography three-dimensional (3D) thermal effusivity imaging as recited in claim 16 includes said data acquisition and control computer constructing a matrix $[D\delta_{i,j}+R_{i,j}]$ where D is a positive constant defining a damping parameter,
where $R_{i,j}=R(z_i/l_j)$,
$\delta_{i,j}$ is represented by:

$$\delta_{i,j} = \begin{cases} 1, & \text{if } i = j \\ 0, & \text{if } i \neq j \end{cases}$$

$\delta_{i,j}$ is the Kronecker delta.

18. The apparatus for implementing thermal tomography three-dimensional (3D) thermal effusivity imaging as recited in claim 11 wherein said data acquisition and control computer performing a deconvolution solution process includes said data acquisition and control computer calculating an apparent effusivity function represented by:

$$e_a(t) = \frac{Q}{T(t)\sqrt{\pi t}}$$

where Q is the pulsed energy absorbed on surface z=0 at t=0, T(t) is the surface temperature that is measured by an infrared detector during a thermal imaging test.

19. The apparatus for implementing thermal tomography three-dimensional (3D) thermal effusivity imaging as recited in claim 11 wherein said data acquisition and control computer performing a deconvolution solution process includes said data acquisition and control computer solving said matrix solution equation represented by $$e_{a,i} = D p_i^n = \sum_{j=1}^{M} p_j^{n+1}[D\delta_{i,j} + R_{i,j}],$$

$$i = 1, 2, 3, \ldots M, n = 0, 1, 2, 3, \ldots$$

where thermal effusivity $E_i$ depth distribution is identified by $$E_i = \sum_{j=i}^{M} p_j^{n+1}$$

for i, j=1, 2, 3, ... M uniformly discretized number (1–M) of uniform grids of set size for an entire depth of a sample,
the superscript n is the iteration number,
$p_j$ is unknown parameter to be solved, and in the first step of the iteration, $p_j^0 = 0$;
D is a positive constant defining a damping parameter,
$\delta_{i,j}$ is represented by:

$$\delta_{i,j} = \begin{cases} 1, & \text{if } i = j \\ 0, & \text{if } i \neq j \end{cases}$$

$\delta_{i,j}$ is the Kronecker delta.

20. The apparatus for implementing thermal tomography three-dimensional (3D) thermal effusivity imaging as recited in claim 11 includes said data acquisition and control computer constructing plane and cross-section effusivity images.

\* \* \* \* \*